United States Patent
Keaton et al.

(10) Patent No.: US 9,379,516 B2
(45) Date of Patent: *Jun. 28, 2016

(54) MULTIPLE WAVELENGTH RAMAN LASER

(71) Applicant: IPG (IPG Photonics Corporation), Oxford, MA (US)

(72) Inventors: Gregory L. Keaton, San Francisco, CA (US); Manuel J. Leonardo, San Francisco, CA (US); Mark W. Byer, Mountain View, CA (US); Kiyomi Monro, Howell, MI (US)

(73) Assignee: IPG Photonics Corporation, Oxford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/685,368

(22) Filed: Apr. 13, 2015

(65) Prior Publication Data
US 2015/0222085 A1    Aug. 6, 2015

Related U.S. Application Data

(63) Continuation of application No. 13/090,585, filed on Apr. 20, 2011, now Pat. No. 9,008,132.

(60) Provisional application No. 61/326,534, filed on Apr. 21, 2010.

(51) Int. Cl.
*H01S 3/30* (2006.01)
*H01S 3/067* (2006.01)
*G02F 1/35* (2006.01)
(Continued)

(52) U.S. Cl.
CPC .............. *H01S 3/302* (2013.01); *G02F 1/3532* (2013.01); *H01S 3/0675* (2013.01); *H01S 3/0941* (2013.01); *H01S 3/094003* (2013.01); *H01S 3/109* (2013.01); *H01S 3/1086* (2013.01); *G02F 2001/3548* (2013.01); *H01S 3/0092* (2013.01); *H01S 3/06754* (2013.01);
(Continued)

(58) Field of Classification Search
CPC ............... H01S 3/302; H01S 3/08086; H01S 3/094046; H01S 3/1086
See application file for complete search history.

(56) References Cited

U.S. PATENT DOCUMENTS

| | | |
|---|---|---|
| 4,063,106 A | 12/1977 | Ashkin et al. |
| 6,163,552 A | 12/2000 | Engelberth et al. |

(Continued)

FOREIGN PATENT DOCUMENTS

| | | |
|---|---|---|
| EP | 1241746 A | 9/2002 |
| JP | 2006122081 A | 5/2006 |

(Continued)

OTHER PUBLICATIONS

Final Office Action for U.S. Appl. No. 13/090,585, dated Nov. 12, 2014.

(Continued)

*Primary Examiner* — Tod T Van Roy
(74) *Attorney, Agent, or Firm* — Joshua D. Isenberg; JDI Patent

(57) ABSTRACT

A pulsed laser system may include a Raman fiber that is configured to act as multiple wavelength Raman laser. The fiber is configured to receive a pulsed input beam from an input source and convert the input beam to an output beam having narrow band outputs at first and second frequencies $v_1$ and $v_2$.

14 Claims, 6 Drawing Sheets

(51) Int. Cl.
  *H01S 3/094* (2006.01)
  *H01S 3/108* (2006.01)
  *H01S 3/109* (2006.01)
  *H01S 3/00* (2006.01)
  *H01S 3/08* (2006.01)
  *H01S 3/0941* (2006.01)
  *H01S 3/23* (2006.01)

(52) U.S. Cl.
  CPC ........ *H01S 3/08086* (2013.01); *H01S 3/09415* (2013.01); *H01S 3/2316* (2013.01)

(56) References Cited

U.S. PATENT DOCUMENTS

| | | |
|---|---|---|
| 6,249,630 B1 | 6/2001 | Stock et al. |
| 6,301,273 B1 | 10/2001 | Sanders et al. |
| 6,407,855 B1 | 6/2002 | Maccormack et al. |
| 6,587,486 B1 | 7/2003 | Sepp et al. |
| 6,785,041 B1 | 8/2004 | Vodopyanov |
| 7,116,469 B2 | 10/2006 | Bragheri et al. |
| 7,436,585 B1 | 10/2008 | Di Teodoro et al. |
| 9,008,132 B2 * | 4/2015 | Keaton ................. H01S 3/0675 359/328 |
| 2002/0125228 A1 | 9/2002 | Smart et al. |
| 2003/0138000 A1 | 7/2003 | Bayart et al. |
| 2004/0179797 A1 | 9/2004 | Po et al. |
| 2005/0024716 A1 | 2/2005 | Nilsson et al. |
| 2005/0027416 A1 | 2/2005 | Basir et al. |
| 2006/0126675 A1 | 6/2006 | Eno et al. |
| 2006/0198397 A1 | 9/2006 | Korolev et al. |
| 2007/0041083 A1 | 2/2007 | Di et al. |
| 2008/0013574 A1 | 1/2008 | Furuya et al. |
| 2008/0075130 A1 | 3/2008 | Mizuuchi et al. |
| 2008/0259969 A1 | 10/2008 | Piper et al. |
| 2009/0154508 A1 | 6/2009 | Chou et al. |
| 2009/0225793 A1 | 9/2009 | Marciante et al. |
| 2010/0080252 A1 | 4/2010 | Shaw et al. |
| 2011/0058578 A9 | 3/2011 | Ogilvy et al. |

FOREIGN PATENT DOCUMENTS

| | | |
|---|---|---|
| WO | 2007127356 A2 | 11/2007 |
| WO | 2008008678 A | 1/2008 |

OTHER PUBLICATIONS

Non-Final Office Action for U.S. Appl. No. 13/090,585, dated Jun. 9, 2014.
Notice of Allowance for U.S. Appl. No. 13/090,585, dated Dec. 5, 2014.
Japanese Office Action for JP Application No. 2013-506278, dated Jan. 21, 2015.
International Search Report and Written Opinion for International Application No. PCT/US2011/033296, dated Jun. 29, 2011.
European Search Report and Written Opinion for EP Application No. 11772657.0, dated Aug. 30, 2013.

* cited by examiner

START 1000.0 nm
RB 0.1 nm

STOP 1300.0 nm

MULTIPLE WAVELENGTH RAMAN LASER

CLAIM OF PRIORITY

This application is a continuation of U.S. patent application Ser. No. 13/090,585, filed Apr. 20, 2011, the entire contents of which are incorporated herein by reference. U.S. patent application Ser. No. 13/090,585 claims the priority benefit of co-pending U.S. Provisional Patent Application No. 61/326,534 filed Apr. 21, 2010, the entire contents of which are incorporated herein by reference.

FIELD OF THE INVENTION

Embodiments of the present invention are related to lasers and more specifically to multiple-wavelength Raman lasers.

BACKGROUND OF THE INVENTION

High-powered optical sources have many applications in which an intense beam of light is focused onto a substrate or other target. Many high power optical systems make use of wavelength conversion to produce light having a desired wavelength or range of wavelengths. Often the process of conversion involves performing some non-linear optical wavelength conversion on input light from a source, such as a laser. The wavelengths that can be produced by nonlinear optical wavelength conversion are limited however by the wavelengths that can be produced with available lasers and the nonlinear optical wavelength conversion processes. For example, many wavelength converted laser systems are based on a seed laser that produces light at a fundamental vacuum wavelength of 1064 nanometers. The infrared 1064 nm light can be converted to 532 nm visible light by nonlinear frequency doubling.

It would be desirable to have a light source that can produce light at new wavelengths that cannot be reached by the usual nonlinear conversion processes for 1064 nm laser light. It would also be desirable to be able to easily select from among several different wavelengths of available laser light. An example of an application of such a light source is super-resolution microscopy, such as Stimulated Emission Depletion (STED) microscopy. The STED technique operates on a sample that has been tagged with a fluorescent dye, and uses a depletion laser to de-excite the dye molecules except in a very small region. The source of subsequent fluorescence can then be located to within tens of nanometers. The highest resolution is achieved when the depletion laser is pulsed rather than continuous.

It is within this context that embodiments of the present invention arise.

DETAILED DESCRIPTION

Figure 1:
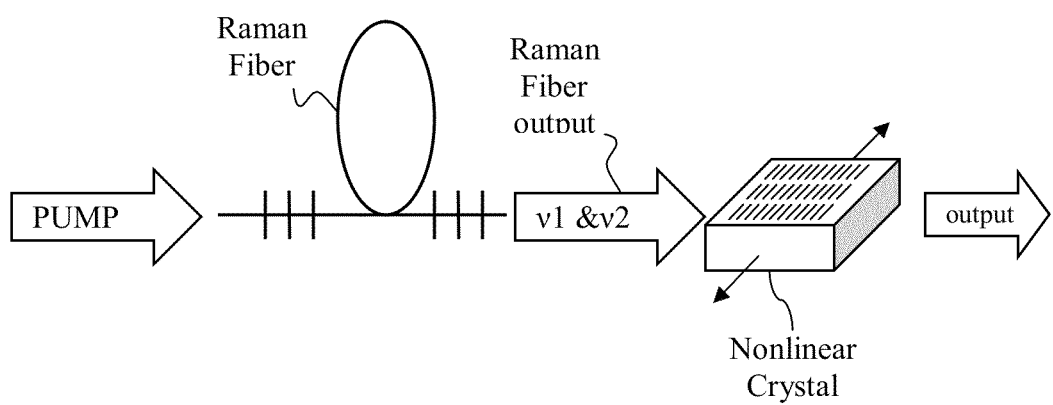
FIG. 1 is a schematic diagram of a Raman Laser system in accordance with an embodiment of the present invention.

Glossary:

As used herein:

Cavity or Optically Resonant Cavity refers to an optical path defined by two or more reflecting surfaces along which light can reciprocate or circulate. Objects that intersect the optical path are said to be within the cavity.

Chirping refers to a rapid change as opposed to a long-term drift in the emission wavelength of an optical source.

Continuous wave (CW) laser refers to a laser that emits radiation continuously rather than in short bursts, as in a pulsed laser.

Duty Cycle (D) refers to the product of the pulse duration $\tau$ and the pulse repetition frequency (PRF) for pulses that occur at regular intervals. The duty cycle may be expressed as a ratio, for example, 0.01 or equivalently may be expressed as a percentage, for example 1%.

Diode Laser refers to a light-emitting diode designed to use stimulated emission to generate a coherent light output. Diode lasers are also known as laser diodes or semiconductor lasers.

Diode-Pumped Laser refers to a laser having a gain medium that is pumped by a diode laser.

Gain refers to an increase in intensity, power, or pulse energy of a signal that is transmitted from one point to another through an amplifier. The term "unsaturated gain" refers to the increase of a small signal passing through the amplifier, which does not significantly change the inversion level in the amplifier. As used herein gain and unsaturated gain will be used interchangeably.

Gain Medium refers to a material capable of generating optical gain as described below with respect to a Laser.

Infrared Radiation refers to electromagnetic radiation characterized by a vacuum wavelength between about 700 nanometers (nm) and about 100,000 nm.

Laser is an acronym for light amplification by stimulated emission of radiation. A laser is a cavity that contains a lasable material, or gain medium. This is any material—crystal, glass, liquid, semiconductor, dye or gas—the atoms of which are capable of emitting light when pumped, e.g., by other light or an electric discharge. The light emission is stimulated by the presence by a passing photon, which causes the emitted photon to have approximately the same phase and direction as the stimulating photon. The light (referred to herein as stimulated radiation) oscillates within the cavity, with a fraction ejected from the cavity to form an output beam.

Light: As used herein, the term "light" generally refers to electromagnetic radiation in a range of frequencies running from infrared through the ultraviolet, roughly corresponding to a range of vacuum wavelengths from about 1 nanometer ($10^{-9}$ meters) to about 100 microns.

Non-linear effect refers to a class of optical phenomena that can typically be viewed only with nearly monochromatic, directional beams of light, such as those produced by a laser. Higher harmonic generation (e.g., second-, third-, and fourth-harmonic generation), optical parametric oscillation, sum-frequency generation, difference-frequency generation, optical parametric amplification, and the stimulated Raman Effect are examples of non-linear effects.

Nonlinear Optical Wavelength Conversion Processes are non-linear optical processes whereby input light of a given vacuum wavelength $\lambda_0$ passing through a non-linear medium interacts with the medium and/or other light passing through the medium in a way that produces output light having a different vacuum wavelength than the input light. Nonlinear wavelength conversion is equivalent to nonlinear frequency conversion, since wavelength and frequency are related by the vacuum speed of light. Both terms may be used interchangeably. Nonlinear Optical Wavelength conversion includes:

Higher Harmonic Generation (HHG), e.g., second harmonic generation (SHG), third harmonic generation (THG), fourth harmonic generation (FHG), etc., wherein two or more photons of input light of frequency $f_0$ interact in a way that produces an output light photon having a frequency $Nf_0$, where N is the number of photons that interact. For example, in SHG, N=2.

Sum Frequency Generation (SFG), wherein an input light photon of frequency $f_1$ interacts with another input light photon of frequency $f_2$ in a way that produces an output light photon having a frequency $f_1+f_2$.

Difference Frequency Generation (DFG), wherein an input light photon of frequency $f_1$ interacts with another input light photon of frequency $f_2$ in a way that produces an output light photon having a frequency $f_1-f_2$.

Non-linear material refers to materials that possess a non-zero nonlinear dielectric response to optical radiation that can give rise to non-linear effects. Examples of non-linear materials include crystals of lithium niobate ($LiNbO_3$), lithium triborate (LBO), beta-barium borate (BBO), Cesium Lithium Borate (CLBO), KDP and its isomorphs, $LiIO_3$, as well as quasi-phase-matched materials, e.g., PPLN, PPSLT, PPKTP and the like.

Optical amplifier refers to an apparatus that amplifies the power of an input optical signal. An optical amplifier is similar to a laser in that it uses a gain medium driven by pumping radiation. The amplifier generally lacks feedback (i.e. a cavity), so that it has gain but does not oscillate. As used herein an optical power amplifier generally refers to the last optical amplifier before delivery of an amplified beam to a target or a wavelength converter. An amplifier stage between a source of radiation and a power amplifier is generally referred to herein as a preamplifier.

Phase-matching refers to the technique used in a multiwave nonlinear optical process to enhance the distance over which the coherent transfer of energy between the waves is possible. For example, a three-wave process is said to be phase-matched when $k_1+k_2=k_3$, where $k_i$ is the wave vector of the $i^{th}$ wave participating in the process. In frequency doubling, e.g., the process is most efficient when the fundamental and the second harmonic phase velocities are matched. Typically the phase-matching condition is achieved by careful selection of the optical wavelength, polarization state, and propagation direction in the non-linear material.

Pulse Duration ($\tau$) refers to the temporal duration or lifetime of a repetitive signal, e.g., the time interval between the half-power points on the leading and trailing edges of the pulse. Pulse duration is sometimes referred to as "pulse width".

Pulse Energy refers to the amount of energy in a pulse. Pulse energy may be calculated by integrating instantaneous pulse power over the pulse duration.

Pulse Period (T) refers to the time between equivalent points of successive pulses in a train of two or more pulses.

Pulse Repetition Frequency (PRF) refers to the rate of repetition of pulses per unit time. The PRF is inversely related to the period T, e.g., PRF=1/T.

Q refers to the figure of merit of a resonator (cavity), defined as $(2\pi)\times$(average energy stored in the resonator)/(energy dissipated per cycle). The higher the reflectivity of the surfaces of an optical resonator and the lower the absorption losses, the higher the Q and the less energy loss from the desired mode.

Quasi-CW refers to generating a succession of pulses at a high enough repetition rate to appear continuous.

Quasi Phase-matched (QPM) Material: In a quasi-phase-matched material, the fundamental and higher harmonic radiation are approximately phase-matched by periodically changing the sign of the material's non-linear coefficient. The period of the sign change ($k_{QPM}$) adds an additional term to the phase matching equation such that $k_{QPM}+k_1+k_2=k_3$. In a QPM material, the fundamental and higher harmonic can have identical polarizations, often improving efficiency. Examples of quasi-phase-matched materials include periodically-poled lithium tantalate (PPLT), periodically-poled lithium niobate (PPLN), periodically poled stoichiometric lithium tantalate (PPSLT), periodically poled potassium titanyl phosphate (PPKTP) or periodically poled microstructured glass fiber.

Raman Scattering refers to a scattering of incident light by matter in which the scattered light has a lower frequency than the incident light. The difference between the frequencies of the incident and scattered light (referred to as the Raman shift) corresponds to a natural vibrational frequency of the scattering material.

Saturation of an optical amplifier refers to a decrease of the gain coefficient of a medium near some transition frequency when the power of the incident radiation near that frequency exceeds a certain value. If the gain coefficient is constant, the power emitted by the medium is proportional to the incident power. However, there is typically a limit to the rate at which a gain medium can emit power. This limit depends on the lifetimes of the energy levels involved. As this limit is reached, the stimulated transitions become rapid enough to significantly lower the upper energy level population, thereby decreasing the gain coefficient. The effect is to "flatten" the amplified power as a function of input power.

Stimulated Raman Scattering (SRS) is a type of Raman scattering that can occur with an intense optical beam. The Raman-scattered light experiences gain and its power increases exponentially. If the power of the incident light exceeds a threshold value, a large portion of the incident light is converted to Raman-scattered light having a lower frequency than the incident light. SRS is also sometimes known as the stimulated Raman effect or coherent Raman effect.

Ultraviolet (UV) Radiation refers to electromagnetic radiation characterized by a vacuum wavelength shorter than that of the visible region, but longer than that of soft X-rays. Ultraviolet radiation may be subdivided into the following wavelength ranges: near UV, from about 380 nm to about 200 nm; far or vacuum UV (FUV or VUV), from about 200 nm to about 10 nm; and extreme UV (EUV or XUV), from about 1 nm to about 31 nm.

Vacuum Wavelength: The wavelength of electromagnetic radiation is generally a function of the medium in which the wave travels. The vacuum wavelength is the wavelength that electromagnetic radiation of a given frequency would have if the radiation were propagating through a vacuum and is given by the speed of light in vacuum divided by the frequency.

Introduction

The basic goal of embodiments of the present invention is to produce laser beams of various visible colors, starting with a pulsed infrared pump beam. As an example, the pump beam can have a wavelength of about 1060 nm. Embodiments of the invention utilize a synchronously pumped Raman laser that is resonant at two wavelengths simultaneously. The Raman laser converts the pump light primarily into two other frequencies, $v_1$ and $v_2$. With these two frequencies, the system can make three different frequencies of output light using nonlinear materials: $2v_1$, $2v_2$, and $v_1+v_2$. The frequencies $v_1$ and $v_2$ are made in a Raman laser, rather than by single-pass Raman generation in a fiber, to ensure that their bandwidths are narrow enough that they can be efficiently converted by a nonlinear material.

The basic layout of a system in accordance with an embodiment of the present invention is shown in FIG. 1. A pump beam from a pump source is coupled into a Raman fiber that is configured to act as a multiple wavelength Raman laser. The Raman fiber may also include an optional single-pass Raman generating segment, as discussed below. The output of the Raman fiber is then focused into a nonlinear crystal. One possible nonlinear crystal that can be used is a periodically poled lithium niobate (PPLN) crystal, which may be doped with magnesium oxide (MgO) for longevity.

In principle, many other nonlinear materials, such as LBO may be used for the nonlinear crystal. However, an advantage of PPLN is that its nonlinearity is very high, so it efficiently converts even low power beams. This can be important if the peak powers of the pulses coming out of the Raman laser are relatively low, e.g., on the order of 100 W. In this power range, the conversion efficiency for LBO, could be very low, e.g., 1% or so, whereas PPLN is expected to give conversion efficiencies of 50% or higher.

By way of example, and not by way of limitation, the PPLN can have three poling regions: one for frequency doubling the first frequency $v_1$, one for frequency doubling the second frequency $v_2$, and one for frequency summing the two frequencies $v_1$ and $v_2$. Such a system can be configured to generate any one of three output frequencies by moving the nonlinear crystal laterally to select the poling region that creates light of the desired frequency.

Periodic poling of nonlinear crystal materials is a technique for obtaining quasi-phase matching of nonlinear interactions. It involves a process which generates a periodic reversal of the domain orientation in a nonlinear crystal, so that the sign of the nonlinear coefficient also changes in a regular fashion with a characteristic period. A common technique for periodic poling is ferroelectric domain engineering, which involves the application of a strong electric field to a ferroelectric crystal via patterned electrodes on the crystal surface. The electrode pattern, which can be produced with a photolithographic process, typically has a period between a few microns and some tens of microns. The poling period (i.e. the period of the electrode pattern) determines the wavelengths for which certain nonlinear processes can be quasi-phase-matched. Domain reversal occurs for an electric field strength greater than a so-called coercive field strength that is characteristic of the nonlinear crystal. By way of example, the coercive field strength for congruent lithium niobate ($LiNbO_3$) is about 21 kilovolts per millimeter.

A nonlinear crystal with two or more different poling regions can be created by forming a suitable pattern of poling electrodes on the crystal with two or more poling regions of different characteristic periods in a side-by-side configuration. A sufficient voltage can then be applied to the electrodes.

The Raman Effect

When intense laser light is coupled into an optical fiber, it generates a second, longer wavelength due to stimulated Raman scattering. This Raman-scattered light can itself undergo Raman scattering. If the fiber is long enough, the process cascades to produce several wavelengths, or Stokes lines, as shown in FIG. 2.

Figure 2:
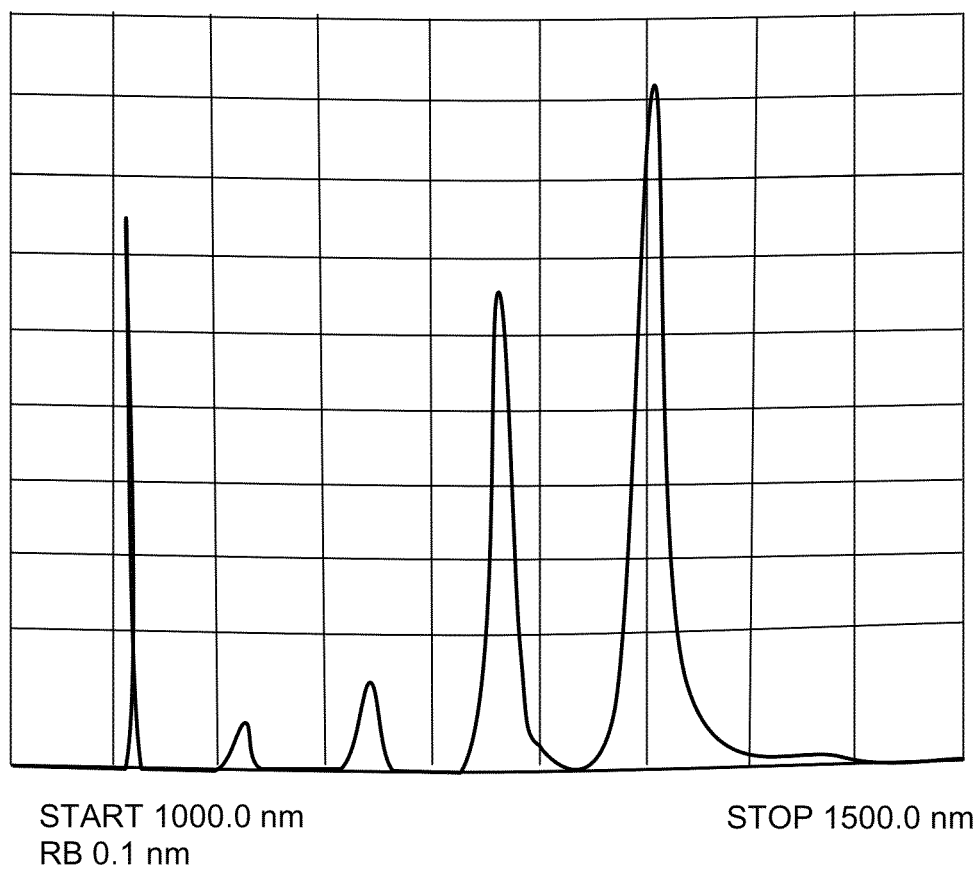
FIG. 2 is a photograph of a spectrum analyzer illustrating generation of Raman-shifted light in a passive fiber.

The data in FIG. 2 above was taken with standard polarization-maintaining, single mode fiber commercially available from ThorLabs of Newton, N.J. The wavelengths generated by a 1060 nm pump beam coupled into the fiber are, approximately:

1. 1114 nm
2. 1170 nm
3. 1232 nm
4. 1301 nm

For convenience the different bands of radiation produced by Raman-shifting in the Raman fiber are referred to as "Raman lines". The problem with the spectrum shown in FIG. 2, is that the Raman lines are too wide. To efficiently convert the Raman lines into visible wavelengths using a nonlinear crystal such as PPLN, it is desirable for the Raman lines to be less than about 1 nm wide. However, the peaks in FIG. 2 are about 10 nm wide or more.

Narrowing the Raman Spectrum

Figure 4A:
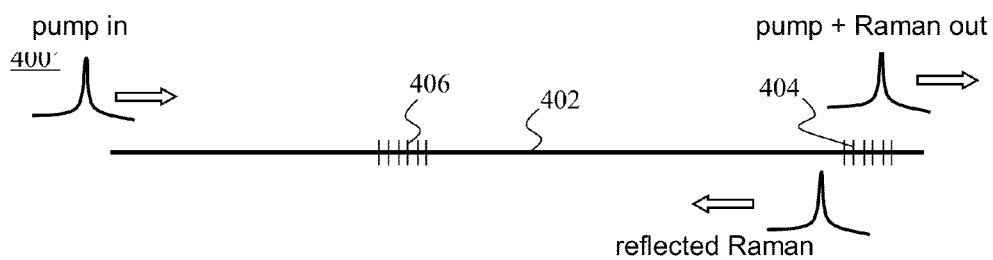
FIG. 4A is a schematic diagram of a synchronously-pumped Raman laser according to an alternative embodiment of the present invention.

The solution to the problem of broad Raman lines is to create a synchronously pumped Raman laser. To see how this works, consider a laser, like the laser 400 shown in FIG. 4A, that is resonant at the first Raman wavelength, e.g., about 1114 nm. Gratings 404, 406 are put into a fiber 402 that reflect light of the first Raman wavelength, but transmit the pump light, e.g., at a wavelength of 1060 nm. The round-trip time between the gratings is an integer multiple of the time between pulses in the pump beam, so that some of the Raman light generated from one pulse is used to seed a subsequent pulse. The gratings reflect only a narrow bandwidth, e.g., about 1 nm or less, so that subsequent Raman pulses will be narrow because they are seeded by a narrow pulse.

The round-trip time between gratings can be made an integer multiple of the time between pump pulses with sufficient accuracy provided the pump pulses preferably overlap with the pulse that circulates within the Raman laser to within 10% of the pulse width. By way of example, for a pulse width of 1 nsec, the mismatch in timing between the pulses is preferably 100 psec or less. In this example, if the repetition rate of the pump source is fixed, the distance between the gratings must be controlled to within 1 cm.

Preferably, the grating 404 toward the exit end of the fiber has a relatively low reflectivity, e.g., between about 1% and about 5%. The grating 406 at the input end of the fiber preferably has a relatively high reflectivity, e.g., greater than about 95%. The low reflectivity grating preferably has a narrow bandwidth, e.g., about 0.2 nm. The bandwidth of the highly reflective grating is less important; its bandwidth can simply be wide enough to transmit the pump radiation and reflect back all the light it receives from the low reflectivity grating.

Laser Power And Pulse Shape Considerations

The input laser, or pump, can be characterized by a wavelength $\lambda_0$ and power $P_0(z)$ at a distance z along the fiber. The pump produces Raman-scattered light having wavelength $\lambda_1$ and power $P_1(z)$; this light then Raman scatters to produce light of wavelength $\lambda_2$ and power $P_2$, and so on. For a silica fiber, the wavelengths $\lambda_i$ are determined by the Stokes shift in silica: $(1/\lambda_{i-1} - 1/\lambda_i) \approx 440$ cm$^{-1}$. The Raman scattering strength depends on the Raman gain $g_R$ ($\approx 0.1$ μm$^2$/(W·m)), the mode area of the fiber A, and a spontaneous emission power f.

The evolution of the Raman cascade in a single pass through a length of the fiber is described mathematically as follows:

$$\frac{dP_0}{dz} = \frac{\lambda_1}{\lambda_0} \frac{g_R}{A} P_0 P_1 \quad (1)$$

$$\frac{dP_1}{dz} = \frac{g_R}{A} P_0(P_1 + f) - \frac{\lambda_2}{\lambda_1} \frac{g_R}{A} P_1 P_2$$

$$\frac{dP_2}{dz} = \frac{g_R}{A} P_1(P_2 + f) - \frac{\lambda_3}{\lambda_2} \frac{g_R}{A} P_2 P_3 \ldots \text{etc.}$$

The spontaneous emission power f is equal to the energy of one photon multiplied by the effective bandwidth for the Raman transition. In a typical embodiment, the ratio of the spontaneous emission power f to the input power $P_0(0)$ is approximately $e^{-21}$.

Figure 3:
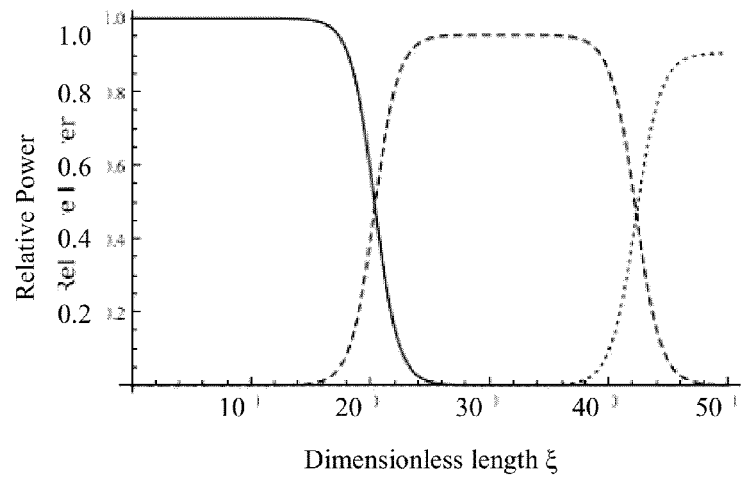
FIG. 3 is a graph showing relative power as a function of dimensionless length $\xi$ for single-pass Raman generation in an optical fiber.

Equations (1) can be integrated numerically to obtain the powers $P_i$ at each point along the fiber; the result is shown in FIG. 3. The powers are graphed as functions of a dimensionless length $\xi$, related to the distance z along the fiber and to the input pump power $P_0(0)$ by:

$$\xi = \frac{g_R P_0(0) z}{A} \quad (2)$$

Parameter $\xi$ characterizes the amount of Raman radiation that is created by the laser. In FIG. 3, the powers of the pump wavelength (solid line), the first Raman wavelength (dashed line), and the second Raman wavelength (dotted line) are shown. All powers are relative to the pump power at the input end, $P_0(0)$. The model on which FIG. 3 is based assumes that the pulses have perfect "top-hat profiles", both in time and space.

Multiple Wavelength Raman Laser

The Raman light generated in a single pass in fiber is not, however, suitable for frequency conversion because of the large spectral width of the Raman peaks. To narrow the spectra, and to provide more than one wavelength for frequency conversion, we have developed a dual-wavelength synchronously pumped Raman laser 400', illustrated in FIG. 4B. The Raman laser 400' includes an optical fiber 402 with low reflectivity gratings $404_1$, $404_2$ at its output end and high reflectivity gratings $406_1$, $406_2$ at its input end. By way of example and not by way of limitation, the low reflectivity gratings $404_1$, $404_2$ may have a reflectivity of about 1% to about 5% (e.g., approximately 5% reflectivity) and a narrow bandwidth (e.g., about 0.2 nm) at each of two Stokes wavelengths $\lambda_1$, $\lambda_2$ to reflect back part of the Raman light generated from pump light that is input to the fiber 402. The two Stokes wavelengths $\lambda_1$, $\lambda_2$ correspond to Raman lines at frequencies $v_1$, $v_2$. The high reflectivity gratings $406_1$, $406_2$ may have a reflectivity of about 95% or greater at the corresponding Stokes wavelengths $\lambda_1$, $\lambda_2$. The distance between the input end gratings $404_1$, $404_2$ and the output end gratings $406_1$, $406_2$ is selected such that a round-trip time of the laser is arranged to be a multiple of the time between pulses, so that the narrow-band reflected light seeds a subsequent pump pulse.

The gratings $404_1$, $404_2$, $406_1$, $406_2$ can be made by exposing the fiber 402 to a striped pattern of ultraviolet light. The index of the fiber changes where the fiber is exposed to the UV light. So the stripes of UV light create alternating regions of higher and lower refractive index in the fiber. This pattern of index modulation is the grating; the period of the grating (distance between stripes) determines the reflected wavelength. Such gratings are also called Bragg gratings, or fiber Bragg gratings. In principle, two such gratings can be imprinted into the same region of the fiber, one grating for each desired wavelength. A more practical alternative is to create two single-wavelength gratings in the fiber, one after the other. In this case, we have to be careful about the relative order of the gratings on the input and output ends.

It is desirable for light of both Stokes wavelengths $\lambda_1$, $\lambda_2$ to overlap each other and the next pump pulse when they are reflected back at the input end of the fiber. This can be accomplished by making the input end gratings $406_1$, $406_2$ have the same spacing as on the output end gratings $404_1$, $404_2$, and furthermore arranging the gratings so that light of frequency $v_2$, which was lagging behind, is reflected first. This way, the two pulses will overlap when they travel back to the output end of the fiber.

The output power of the dual-wavelength Raman laser can be modeled using Eqs. (1), adding the boundary conditions described above. The result is illustrated in the graph in FIG. 5.

Figure 5:
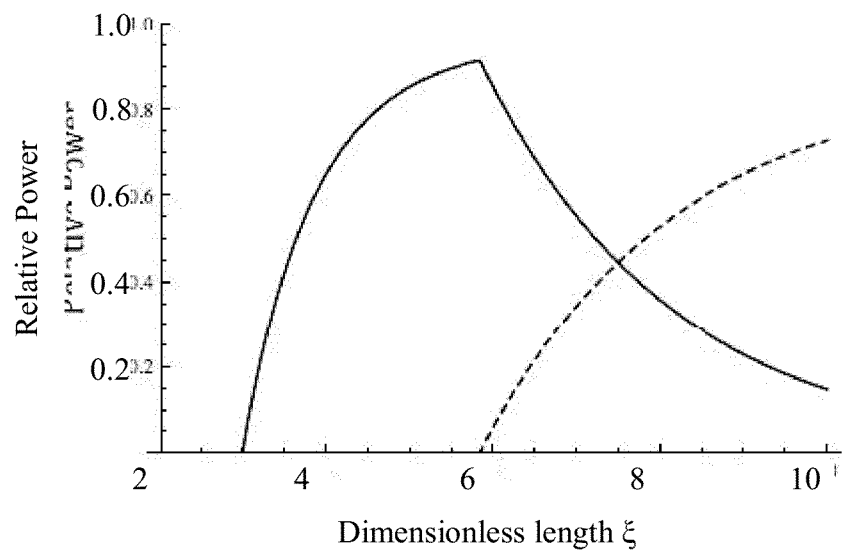
FIG. 5 is a graph illustrating a model for the power output of a dual-wavelength Raman laser vs. a dimensionless length of the laser for ideal top-hat pulses.

The graph in FIG. 5 shows the power, relative to the input pump power, of the first Raman wavelength (solid line) and the second Raman wavelength (dashed line), for ideal top-hat pulses.

As FIG. 5 illustrates, the dual-wavelength laser must have a minimum $\xi$-value to reach the threshold of the first Raman wavelength. As $\xi$ increases, so does the power of the first Raman wavelength, until the threshold of the second Raman wavelength is reached. The two Raman wavelengths have equal power at around $\xi = 7.5$. To build such a laser, first the approximate input peak power $P_0(0)$ and pulse repetition rate can be selected. Then the length of the laser z (i.e., the distance between the input end gratings $404_1$, $404_2$ and output end gratings $406_1$, $406_2$) can be chosen so that the round-trip time in the laser is an integral multiple of the time between pulses, and at the same time, z approximately satisfies Eq. (2) for the value of $\xi$ that gives the desired Raman conversion. The value of $\xi$ can then be fine-tuned by changing the input pump power, thereby adjusting the balance between the two output wavelengths. The models used to generate FIGS. 3 and 5 are based on Eqs. (1), which only use one value for the power at each wavelength. These models ignore the rise and fall times of the pulses, as well as the roughly Gaussian spatial profile of the fiber mode. Therefore FIGS. 3 and 5 only apply to idealized pulses having a top-hat profile in both time and space. In practice, however, the pulse shape is important, since the peak of the pulse is Raman-converted more quickly than the wings.

Therefore, without being tied to any particular theory of operation, it may generally be expected for the Raman conversion process to be less efficient than indicated in FIG. 3 and FIG. 5, although these figures give good qualitative pictures.

Figure 6:
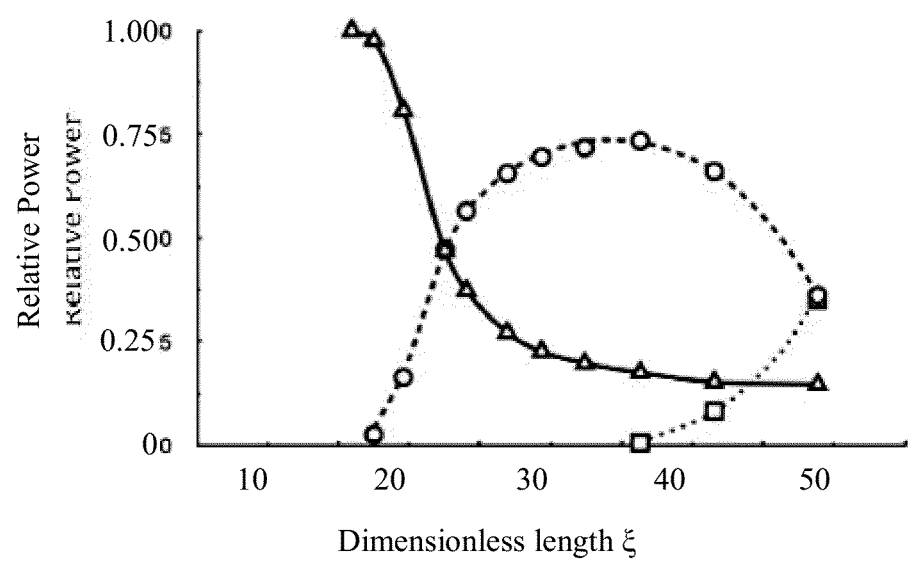
FIG. 6 is a graph depicting experimentally determined single-pass Raman generation in an optical fiber according to an embodiment of the present invention.

FIG. 6 illustrates an example of experimentally determined single-pass Raman generation in an optical fiber, for the pulses used in an embodiment of the present invention. In FIG. 6, the powers of the pump (triangles), the first Raman wavelength (circles), and the second Raman wavelength (squares) are shown. FIG. 6 shows data for the Raman conversion of the actual pulses used in a system. The values of $\xi$ were calculated from the peak powers of the pulses, where the peak power was defined as the pulse energy divided by the pulse duration (full width at half-maximum). It is noted that the value of ξ for which appreciable conversion to the first Raman wavelength occurs is around 40, about twice the value shown in FIG. 3. Therefore, one can reasonably expect that the values of ξ in FIG. 5 would also be multiplied roughly by a factor of two for a real-world system.

Input Pulse Shape Figure of Merit

As noted above, the input pulse shape is an important consideration. Based on experimental results, a procedure for determining a figure of merit (FOM) for the input pulse has been established for use in conjunction with embodiments of the present invention. As used herein, the pulse FOM, generally refers to the percentage of input light that is converted to the first Raman wavelength when the second Raman wavelength starts to appear. By way of example, the second Raman wavelength may be said to "start to appear" when the power of the second Raman wavelength is about 2% of the total power of the first Raman wavelength, the second Raman wavelength, and the input light. The FOM may be then be defined as the percentage conversion to the first Raman wavelength when the power in the second Raman wavelength is about 2% of the input power.

The FOM may be determined experimentally, as follows. The measurement takes place in a single pass in a fiber, not in a laser. If the duty cycle of the input pulse is changed by changing the pulse repetition rate, but keeping pulse duration fixed, the average power remains fixed. If the pulse duration is kept fixed, the pulse repetition rate can be turned down to increase the peak power. Starting at a pulse repetition rate for which no Raman lines appear, the pulse repetition rate can be turned down until the first Raman line (R1) appears. The repetition rate is turned down more until the second Raman line (R2) appears. At this point the power in R1 can be measured when the power in R2 is 2% of the total power in R1+R2+input signal.

As can be seen from FIG. 6, about 78% of the light is converted to the first Raman wavelength when the second Raman wavelength starts to appear at about ξ=62. The exact amount of conversion depends on the pulse shape. An ideal top-hat shape pulse would be expected to give 100% conversion.

Figure 7:
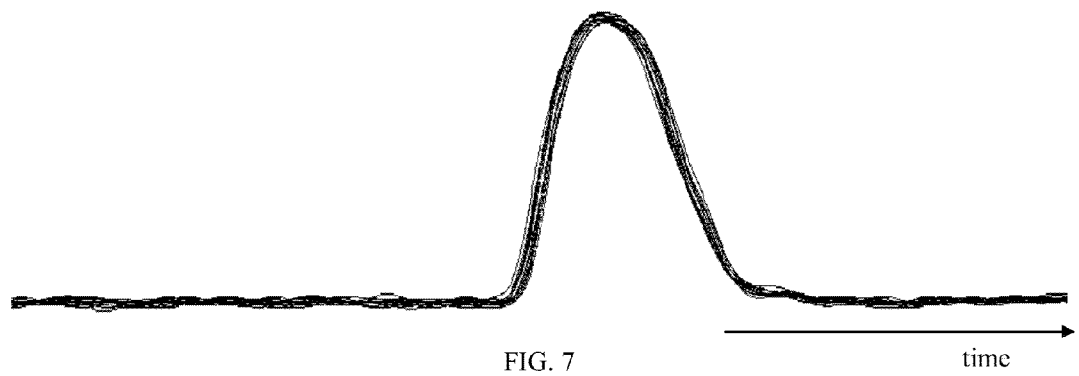
FIG. 7 is an oscilloscope trace illustrating an input pulse shape suitable for use in conjunction with embodiments of the present invention.

To improve the figure of merit, the profile of the pulse (i.e. the power vs. time curve) it is desirable to make the pulse more square, e.g., by decreasing the rise and/or fall time of the pulse compared to the pulse width. An FOM of 40% is probably too low for the present invention to operate efficiently. An FOM of 78% has been observed to work well. It is therefore preferably to have an FOM of greater than about 60%, more preferably greater than about 70%. By way of example, and not by way of limitation FIG. 7 illustrates an oscilloscope trace of a pulse that resulted in a 78% FOM. The pulse in FIG. 7 had a rise time of 547.8 picoseconds, a pulse width of 1.284 nanoseconds, and a fall time of 900.6 picoseconds.

Multiple Wavelength Laser Source Example

Figure 8:
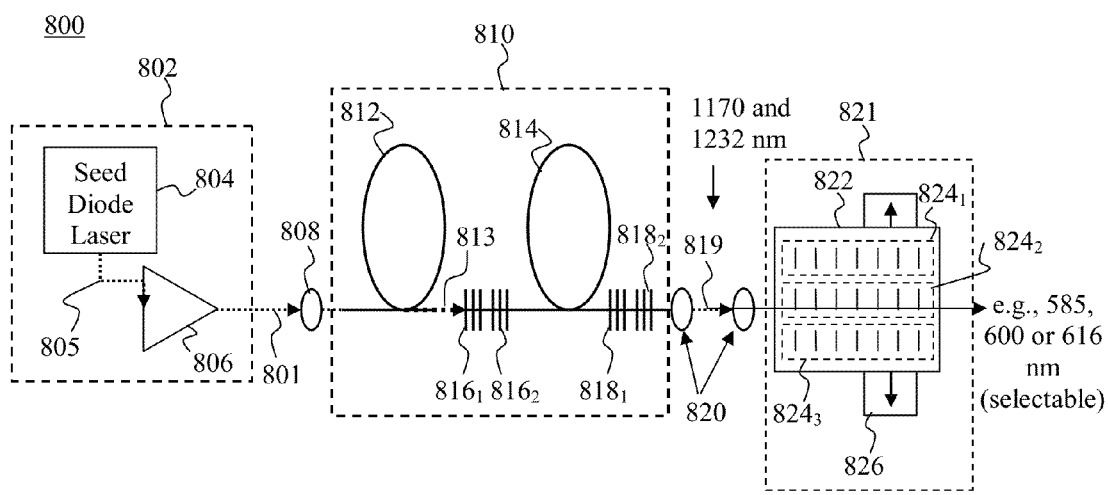
FIG. 8 is a schematic diagram of a synchronously-pumped Raman laser according to another alternative embodiment of the present invention.

A multiple wavelength Raman laser described above need not be pumped by an original pump laser at 1060 nm. FIG. 8 illustrates a multiple-wavelength laser source 800 according to an alternative embodiment of the invention in which a pump beam 801 from a pump laser source 802 can be Raman shifted, e.g., to convert the pump beam 801 to one of the Raman lines listed above, and the resulting Raman-shifted beam could be used to pump a multiple wavelength synchronously-pumped Raman laser 814. The pump laser source 802 may include a diode laser seed source 804 optically coupled to one or more optical amplifiers 806. By way of example, the pump laser source may be a model G1+ laser system from Mobius Photonics of Mountain View, Calif.

The diode laser 804 can be pulsed to produce approximately 1.2 nsec long seed pulses 805 at a wavelength of 1060 nm and a repetition rate of about 20 MHz. The average output power of the diode laser can be about 1 mW. The seed pulses 805 can be amplified by a series of fiber amplifiers 806 to produce an amplified output that provides the pump beam 801. By way of example, and not by way of limitation, the amplifiers 806 may amplify 1 mW 1060 nm seed pulses 805 to a power of about 10 Watts to produce an amplified 1060 nm pump beam 801, which can be optically coupled, e.g., by a lens 808 into a Raman fiber system 810.

The Raman fiber system 810 includes an optional single pass fiber 812 and Raman laser 814. To create a light source with wavelength in the vicinity of 600 nm, the Raman laser 814 can be based not on the first and second Raman shifts from the fundamental wavelength (i.e., the wavelength of the seed pulses 805), but on the second and third Raman shifts. To achieve this, the pump beam 801 can be coupled, e.g., by the lens 808 into the single pass fiber 812, e.g., a 50 m length of single-mode, polarization maintaining, passive fiber. In the single pass fiber 812, stimulated Raman scattering can convert the majority of 1060 nm pump light to the first Raman wavelength at 1114 nm, as illustrated in FIG. 6. The resulting Raman-shifted light 813 can then pump the Raman laser fiber 814.

Figure 4B:
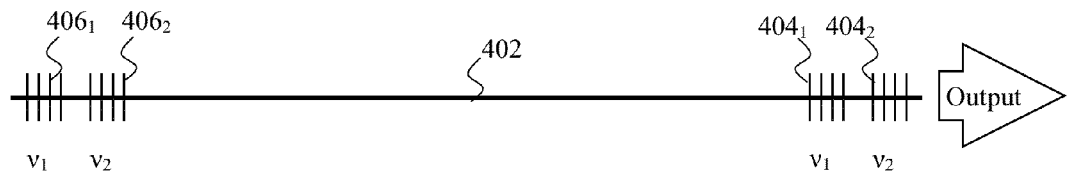
FIG. 4B is a schematic diagram of a possible configuration of a Raman fiber for a Raman laser according to an alternative embodiment of the present invention.

About 60% of the light from the fiber amplifier chain is coupled into the passive fiber, or about 6 Watts of average power under typical conditions. This corresponds to a peak power of about 250 Watts, and a ξ□ value of about 37 for the passive fiber 812. The output 813 of the passive fiber 813 is spliced to a 30 m long dual-wavelength Raman laser made from single-mode, polarization-maintaining fiber as shown in FIG. 4B. At the input end of the Raman laser 814 are inscribed two high-reflectivity Bragg gratings $816_1$, $816_2$ in close proximity. Two similarly configured low-reflectivity Bragg gratings $818_1$, $818_2$ can be inscribed at the output end of the Raman laser 814. The input end gratings $816_1$, $816_2$ are configured to transmit the pump light 801 but reflect narrow wavelength bands centered at the second and third Stokes shifts from the wavelength of the seed pulses 805 to produce a multiple-wavelength output 819. By way of example, for 1060 nm pump radiation 801, the gratings $816_1$, $818_1$ can be configured to reflect the 1170 nm second Raman wavelength and the gratings $816_2$, $818_2$ can be configured to reflect the 1232 nm third Raman wavelength. The output end gratings $818_1$, $818_2$ are similarly configured to reflect narrow wavelength bands centered at the second and third Stokes shifts though they may transmit the pump radiation 801. The round-trip time in the Raman laser fiber is selected to be some integer multiple of the period between pulses to select the number of pulses circulating in the Raman laser fiber 814. For example, if the round trip time is six times the period between pulses, there are six pulses circulating in the Raman laser, and each pulse seeds the sixth subsequent one.

As noted above, the round-trip time between gratings can be made an integer multiple of the time between pump pulses with sufficient accuracy provided the pump pulses preferably overlap with the pulse that circulates within the Raman laser to within 10% of the pulse width. Alternatively, the repetition rate of the pump source can be tuned to match the distance between the gratings. This can easily be done, e.g., in the embodiment shown in FIG. 8 by pulsing the seed diode laser 804 at the appropriate repetition rate. The pulsing electronics can be triggered by an external function generator, whose repetition rate can be precisely controlled. In our case, the repetition rate is approximately 20 MHz, and the accuracy needed is +/−0.001 MHz. For example, the necessary repetition rate might turn out to be 20.456 MHz, where the 6 is a significant digit. Such accuracy in the repetition rate is easily achieved using a function generator from, for example, Berkeley Nucleonics Corporation in San Rafael, Calif.

It is noted that although two input end gratings $816_1$, $816_2$ and two output end gratings $818_1$, $818_2$ are shown in FIG. 8 for the purposes of example, such a configuration should not be construed as a necessary limitation on any embodiment of the invention. For example, in alternative embodiments, the input end gratings $816_1$, $816_2$ or two output end gratings $818_1$, $818_2$ gratings could be considered two parts of the same grating, and there might be other ways to make a single grating (other than just one after the other) that can reflect the two wavelengths. Consequently, embodiments of the invention may be implemented with one or more gratings at each end of the Raman laser fiber 814 that reflect the desired Raman wavelengths, and these gratings might be compound gratings.

These Raman shifted wavelengths in the multiple-wavelength output 819 can be coupled by lenses 820 to an optical frequency converter 821. By way of example, the frequency converter 821 may include a nonlinear crystal 822 that is phase-matched (or quasi phase-matched) for an appropriate nonlinear optical frequency conversion process, e.g., frequency summing of two or more wavelengths or frequency doubling of individual wavelengths. The nonlinear crystal 822 in the frequency converter 821 may have different poling regions $824_1$, $824_2$, $824_3$ configured for frequency doubling of one wavelength or the other of output 819 or for frequency summing of the two wavelengths. The nonlinear crystal 822 (e.g., periodically poled lithium niobate (PPLN)) can be mounted to a translation stage 826 so that the crystal can be moved to select one of the different regions to provide the desired output wavelength. The fiber used in the single pass fiber and the multiple-wavelength laser can be polarization-maintaining fiber so that the frequency conversion in the PPLN is efficient.

Figure 9:
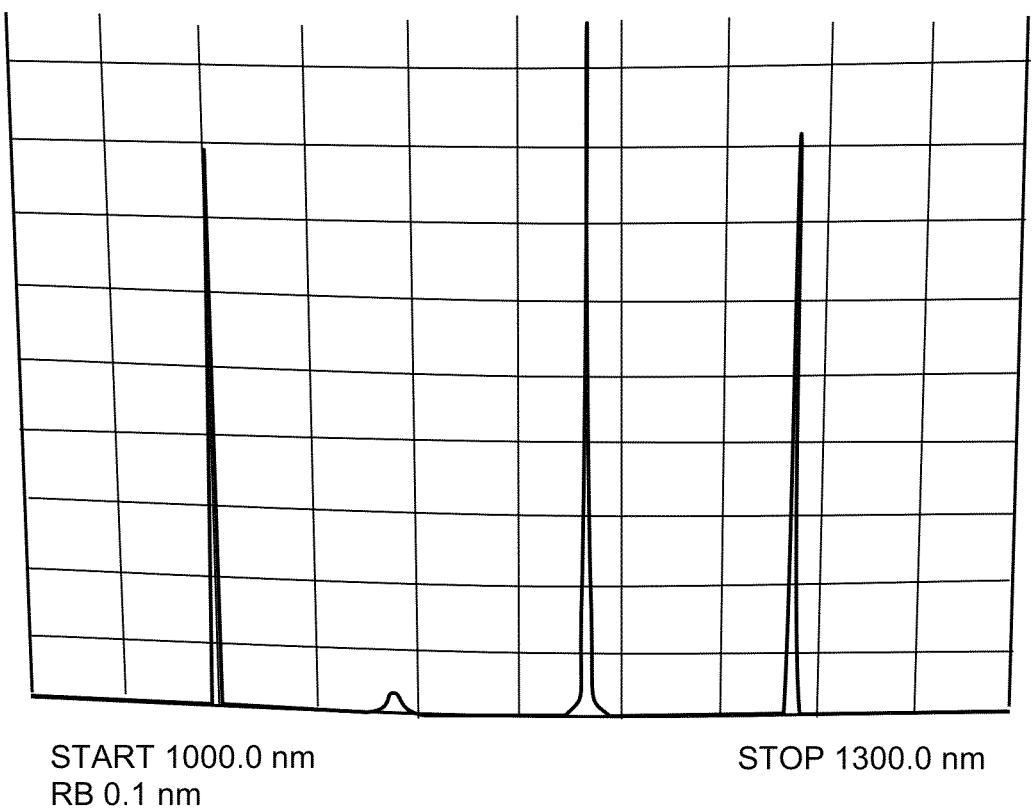
FIG. 9 is a photograph of a spectrum analyzer illustrating a spectrum of a dual-wavelength Raman laser in accordance with an embodiment of the present invention.

FIG. 9 shows an example of an output of a dual-wavelength fiber Raman laser of the type shown in FIG. 8. The figure shows residual laser light at 1060 nm as well as a broad, low peak at 1114 nm due to residual Raman light generated in the passive fiber. FIG. 9 also shows that, in comparison to FIG. 1, the second and third Raman lines have been narrowed considerably, as desired, to widths of about 0.5 nm. Under typical conditions, the ξ☐ value for the Raman laser is about 14, in rough agreement with FIG. 5 and the expected factor of two adjustment for realistic pulse shapes. For 6 Watts of pump power launched into the passive fiber, the Raman laser output is about 2.4 Watts at each of the two laser wavelengths.

Although embodiments of the present invention have been described in considerable detail with reference to certain preferred versions thereof, other versions are possible. Therefore, the spirit and scope of the appended claims should not be limited to the description of the preferred versions contained herein. Instead, the scope of the invention should be determined with reference to the appended claims, along with their full scope of equivalents.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. Any feature, whether preferred or not, may be combined with any other feature, whether preferred or not. In the claims that follow, the indefinite article "A", or "An" refers to a quantity of one or more of the item following the article, except where expressly stated otherwise. Any element in a claim that does not explicitly state "means for" performing a specified function, is not to be interpreted as a "means" or "step" clause as specified in 35 USC §112, ¶6. In particular, the use of "step of" in the claims herein is not intended to invoke the provisions of 35 USC §112, ¶6.

The reader's attention is directed to all papers and documents which are filed concurrently with this specification and which are open to public inspection with this specification, and the contents of all such papers and documents incorporated herein by reference.

What is claimed is:

1. A laser system, comprising:
   an optical fiber configured to receive a pulsed input beam from an input source and convert the input beam to an output beam having outputs at two or more frequencies including a first frequency $v_1$ and a second frequency $v_2$ by Raman scattering;
   a nonlinear material, wherein an output of the optical fiber is focused into the nonlinear material; and
   a pulsed laser input source optically coupled to the optical fiber, wherein the pulsed input source is configured to provide the pulsed input beam, wherein the pulsed input beam is characterized by one or more pulses configured such that a figure of merit (FOM) for the one or more pulses is greater than about 60%, wherein the FOM is given by a percentage conversion of the input beam to the first frequency when the power at the second frequency is about 2% of an input power of the input beam.

2. The system of claim 1, wherein the nonlinear material is a nonlinear crystal.

3. The system of claim 2, wherein the nonlinear crystal is a periodically poled material.

4. The system of claim 3 wherein the periodically poled material is a periodically poled lithium niobate (PPLN) crystal.

5. The system of claim 4 wherein the PPLN crystal is doped with magnesium oxide (MgO).

6. The system of claim 3, wherein the periodically poled material includes two or more poling regions arranged side-by-side, wherein each poling region is configured for a different non-linear frequency conversion.

7. The system of claim 1, wherein the nonlinear material is a periodically poled material having two or more poling regions that include a first poling region configured for frequency doubling of the first frequency $v_1$, a second poling region configured for frequency doubling of the second frequency $v_2$, and a third poling region configured for frequency summing of the first and second frequencies $v_1$ and $v_2$.

8. The system of claim 1, further comprising a translation stage, wherein the nonlinear material is a periodically poled material and the periodically poled material is mounted to the translation stage, wherein the translation stage is configured to translate the periodically poled material with respect to the output beam to align the output beam with a desired poling region.

9. The system of claim 8 wherein a distance between the first and second gratings is configured such that a round trip time between the gratings is an integer multiple of a time between pulses of the input beam.

10. The system of claim 1, further comprising a first grating proximate an input end of the optical fiber and a second grating region proximate an output end of the fiber, wherein the gratings are configured to reflect the first and second frequency outputs but to transmit the input beam.

11. The system of claim 10 wherein the gratings are configured to reflect light over a bandwidth of about 1 nm or less at the first frequency $v_1$ and the second frequency $v_2$.

12. The system of claim 10 wherein the first grating has a reflectivity greater than about 95% and the second grating has a reflectivity between about 1% and about 5%.

13. The system of claim 10 wherein the first and second gratings are configured to reflect radiation corresponding to two or more Raman wavelengths generated in the optical fiber.

14. The system of claim 10 further comprising a passive optical fiber optically having an input end and an output end, wherein the output end is optically coupled to the input of the optical fiber, wherein the passive optical fiber is configured to convert at least a portion of a pump radiation by the Raman effect to generate the input beam.

* * * * *